United States Patent [19]

Duncan et al.

[11] Patent Number: 4,548,746
[45] Date of Patent: Oct. 22, 1985

[54] ROSIN PENTAERYTHRITOL ESTER PREPARATION IMPROVEMENT

[75] Inventors: Don P. Duncan, Mt. Pleasant; Timothy B. Cameron, North Charleston, both of S.C.

[73] Assignee: Westvaco Corporation, New York, N.Y.

[21] Appl. No.: 679,985

[22] Filed: Dec. 10, 1984

Related U.S. Application Data

[63] Continuation-in-part of Ser. No. 610,131, May 14, 1984, abandoned.

[51] Int. Cl.⁴ .............................. C09F 7/00; C09F 1/04
[52] U.S. Cl. ...................................... 260/104; 260/97; 260/97.5
[58] Field of Search ................. 260/104, 97, 97.5

[56] References Cited

U.S. PATENT DOCUMENTS

| | | | |
|---|---|---|---|
| 2,369,125 | 2/1945 | Anderson | 260/104 |
| 2,441,197 | 5/1948 | Kalman | 260/97.5 |
| 2,509,910 | 4/1952 | Witcoff et al. | 260/104 |
| 2,572,086 | 10/1951 | Witcoff et al. | 260/104 |
| 2,729,660 | 1/1956 | Harrison | 260/104 |
| 3,071,604 | 1/1963 | Mohan et al. | 260/410.6 |
| 3,780,012 | 12/1973 | Smith | 260/104 |
| 3,780,013 | 12/1973 | Smith | 260/97.5 |
| 4,172,070 | 10/1979 | Scharrer et al. | 260/104 |

*Primary Examiner*—Herbert S. Cockeram
*Attorney, Agent, or Firm*—Terry B. McDaniel; Richard L. Schmalz

[57] ABSTRACT

Phosphinic acid (also called hypophosphorous acid), when used in very small quantities, is disclosed to act as a catalyst to accelerate the reaction rate of esterification of rosin with pentaerythritol. According to the process of the invention, a rosin is reacted with at least an equivalent amount of pentaerythritol in the presence of phosphinic acid at a temperature of from about 180° C. to about 300° C. When tall oil rosin is esterified by the invention process, a rosin ester is produced without appreciable color degradation.

17 Claims, No Drawings

ROSIN PENTAERYTHRITOL ESTER PREPARATION IMPROVEMENT

This application is a continuation-in-part of co-pending application Ser. No. 610,131, filed May 14, 1984, now abandoned.

BACKGROUND OF THE INVENTION

1. Field of the Invention

This invention relates to an improved method of preparing pentaerythritol esters of rosin. In particular, the improvement of this invention lies in reacting the rosin and pentaerythritol in the presence of very low quantities of phosphinic acid ($H_3PO_2$), as catalyst, to reduce the reaction time for rosin pentaerythritol ester formation. Also, when tall oil rosin is esterified, a rosin pentaerythritol ester of improved color is produced.

2. Description of the Prior Art

Rosin is mainly a mixture of $C_{20}$, fused-ring, monocarboxylic acids, typified by levopimaric and abietic acids, both of which are susceptible to numerous chemical transformations. The rosins to which this invention relates include gum rosin, wood rosin and tall oil rosin.

The natural separation and gradual conversion of some of the hydrophilic components of sap and related plant fluids from the cambium layer of a tree into increasingly hydrophobic solids are the generic process of forming diverse gums, resins and waxes. The oleoresin intermediate in this process is typified in pine gum, which flows from hacks on the trunks of southern yellow pine in southeastern United States, in France, and in other countries. Pine gum contains about 80% (gum) rosin and about 20% turpentine.

Resinification from oleoresin can result from either natural evaporation of oil from an extrudate or slow collection in ducts in sapwood and heartwood. Pinus stumps are valuable enough to be harvested, chipped, and extracted with hexane or higher-boiling paraffins to yield wood rosin, wood turpentine, and other terpene-related compounds by fractional distillation. In the kraft, i.e., sulfate, pulping process for making paper, pinewood is digested with alkali producing crude tall oil and crude sulfate turpentine as by-products. Fractionation of the crude tall oil yields tall oil rosin and fatty acids.

The chemical transformation of gum, wood, and tall oil rosin which relates to this invention is esterification. The beneficial product characteristics provided by rosin esterification for various applications have led to the development of many esterification procedures, particularly treatments with polyhydric alcohols. U.S. Pat. Nos. 2,369,125, 2,590,910 and 2,572,086 teach rosin esterification with glycerol and pentaerythritol, among other polyhydric alcohols, usually preceded by a rosin disproportionation step.

It is generally known in the art that a significant disadvantage of pentaerythritol esterification of tall oil rosin as compared with glycerol esterification is the deterioration of rosin color in the product of the former process. For a tall oil rosin with a starting color of 8 on the Gardner scale, a pentaerythritol ester would have a color of 13-18 while a glycerol ester would have a color of 8-9. Also, extremely long reaction times are required to make the tall oil rosin-pentaerythritol esters (up to 30-48 hours) as compared to making tall oil rosin-glycerol esters under identical conditions (10-12 hours). It was this concern which led to the discovery of the invention process hereinafter claimed.

U.S. Pat. Nos. 3,780,012 and 3,780,013 acknowledge that tall oil rosin, as opposed to gum or wood rosin, darkens significantly upon pentaerythritol esterification and propose alternative solutions. U.S. Pat. No. 3,780,012 teaches pretreating the rosin with paraformaldehyde followed by distillation prior to the esterification reaction. U.S. Pat. No. 3,780,013 teaches the incremental addition of a phenol sulfide compound during the esterification. The color of the product of these procedures was claimed to be an M (U.S.D.A. scale), equal to 11–12 on the Gardner scale. Also, the patents' examples employed a 20% equivalent excess of pentaerythritol.

U.S. Pat. No. 2,729,660 also acknowledges the darkening effect which common esterification catalysts such as strong acids cause on the product during esterification. The patent teaches the use of 0.5 to 5% of either the aliphatic or aromatic esters of phosphorous acid as a catalyst for the esterification of higher fatty acids or rosin acids, or mixtures thereof. In addition to avoiding appreciable color formation during the esterification, a reduction in reaction time is noted. A distinct disadvantage of this process is the dissociation, during esterification, of the alcohol used to make the phosphite ester catalyst resulting in a disagreeable odor.

U.S. Pat. No. 4,172,070 teaches employing arylsulfonic acid in place of the traditional basic esterification catalysts, such as calcium oxide, to reduce the time for tall oil rosin-pentaerythritol esterification to obtain a rosin ester of improved oxygen stability, color and softening point. This work is confounded, however, by the unusually large amount of pentaerythritol used (35% equivalent excess) which by itself would markedly increase the rate of acid number drop. Products with Ring and Ball softening points of 77° C. to 86.5° C. were obtained. Normal commercial pentaerythritol esters of rosins soften between 95° C. and 105° C.

The object of this invention is to provide a novel method of preparing pentaerythritol esters of rosin. It is a further object of this invention to employ a catalyst which accelerates the rosin-pentaerythritol reaction rate to result in a reduced reaction time. It is a still further object of this invention to permit a reduction in the amount of pentaerythritol employed in the reaction, resulting in reduced cost and higher, more desirable softening points, i.e., from 95° C. to 105° C. It is a specific object of this invention to provide a method of preparing pentaerythritol esters of tall oil rosin exhibiting color equivalent to glycerol esters of tall oil rosin.

SUMMARY OF THE INVENTION

All of the above objects are met in the discovery that phosphinic acid (also called hypophosphorous acid), when used in very small quantities, acts as a catalyst to accelerate the rosin-pentaerythritol reaction rate. In particular, a tall oil rosin reacted with at least an equivalent amount of pentaerythritol in the presence of from 0.05% to less than 0.5% phosphinic acid, based on the weight of the rosin, at a temperature of from about 180° C. to about 300° C. produces a tall oil rosin ester having a color only 0–2 Gardner units darker than the starting rosin.

DESCRIPTION OF THE PREFERRED EMBODIMENT

Phosphinic acid is a strong, reducing acid, useful for its antioxidant or color-reducing properties in the preparation of light colored fatty acid taurates (U.S. Pat. No. 3,232,968), carboxylic acid esters with poly(oxyalkylene) compounds (British Pat. No. 979,673 and U.S. Pat. No. 3,071,604), acrylic and methacrylic esters of glycols (Japanese Pat. No. 73 11084), or in light colored alkyl resins (Japanese Pat. No. 12997). Also, phosphinic acid has been used as a tall oil treatment agent to convert the impurities and color bodies contained therein to a nondistillable form and to promote decarboxylation of rosin acids present (U.S. Pat. No. 2,441,197).

A novel rosin esterification process is now provided involving the use of very small quantities of phosphinic acid as the sole esterification catalyst.

The gum, wood, and tall oil rosin materials to which this invention relates may have been subjected to other treatments prior to esterification. For example, in addition to the distillation treatment alluded to in the fractionation extraction processes, the rosin material may have been subjected to disproportionation, hydrogenation, or polymerization, or some combination of these and/or other treatments.

In general, the esterification is effected by introducing the rosin, up to 18% equivalent excess of the pentaerythritol, and from 0.01% to less than 0.5% phosphinic acid, based on the weight of the rosin, into a reaction vessel. The reaction temperature is raised to from about 180° C. to about 300° C., preferably from about 250° C. to about 280° C., for up to about 25 hours or until the rosin acid number is reduced to about 15 or below. The preferred amount of phosphinic acid catalyst is from about 0.1% to about 0.25% based on the weight of the rosin, and no benefit is seen to be derived in employing amounts of 0.5% or more of the phosphinic acid.

Advantageously, the esterification reaction can be accomplished in the presence of an inert atmosphere, provided by a nitrogen purge of the reaction vessel prior to addition of the reactants and a nitrogen sparge during the reaction. Since light color is a desirable property of the rosin ester and the color is sensitive to oxygen exposure, such exposure should be minimized.

Also, since an advantage of the phosphinic acid catalyst is minimal color degradation during esterification, the rosin ester color is primarily dependent upon the color of the starting rosin. When tall oil rosin is esterified, the catalyst of the invention process permits production of an ester only 0-2 Gardner color units darker than the starting rosin. Therefore, from tall oil rosins with a Gardner color of 5, esters with a color of 5-7 are obtained. From tall oil rosins with a Gardner color of 10, esters with a color of 10-12 are obtained.

In the preferred embodiment of the invention process, the rosin starting material is charged into an inert atmosphere in the reaction vessel, followed by the addition of 0.2% (based on the weight of the rosin) of phosphinic acid (50% active in water) and 15-18% equivalent excess pentaerythritol. A very low inert gas sparge, such as nitrogen, is maintained as the mixture is heated to 275° C., which temperature is maintained for a total reaction time of about 18 to 24 hours. After about 18 to 20 hours from initiating the reaction, the inert gas sparge is replaced with a steam sparge, followed by addition of about 0.053% solid sodium hydroxide, based on the weight of the rosin, to neutralize the phosphinic acid catalyst, and the mixture is cooled down. (Alternatively, a 50% aqueous sodium hydroxide solution may be used, but it should be added prior to initiating the steam sparge.) In the more preferred embodiment wherein the rosin material is tall oil rosin, upon cooling, the final product should exhibit a color within 0-2 Gardner color units of the starting rosin and a Ball and Ring softening point of from about 95° C. to about 105° C.

The following examples serve to illustrate the unexpected color improvement in rosin-pentaerythritol esters made by the invention process, as well as the reduced reaction time. Unless otherwise specified, the parts are by weight.

EXAMPLE 1

To a suitable reaction vessel was added 100 parts of a tall oil rosin with a Gardner color of 10, 11.5 parts of pentaerythritol and 0.2 parts of 50% active phosphinic acid in water. The mixture was heated to 250°-260° C. for 20 hours to give an ester with acid number of 13, a 97° C. Ring and Ball softening point and a Gardner color of 11.

EXAMPLE 2

The reaction was carried out as in Example 1 except that the starting rosin color was 5. The product had an acid number of 15, a 96° C. softening point and a Gardner color of 6+.

EXAMPLE 3

The reaction was carried out as in Example 1 except no phosphinic acid was added. The time required to reach acid number 12 was 45 hours and the final Gardner color was 18+. This reaction, compared to Examples 1 and 2, exemplifies the benefits of phosphinic acid over no catalyst.

EXAMPLE 4

To a suitable reaction vessel were added 100 parts of a tall oil rosin with a Gardner color of 6, 12.3 parts of pentaerythritol and 0.1% by weight of 100% active calcium hydroxide used as a catalyst (taught by U.S. Pat. No. 3,780,013) instead of phosphinic acid. The mixture was heated at up to 270° C. for 24 hours to give an ester with an acid number of 5, a 102° C. Ring and Ball softening point and a color of 13. This reaction, compared to Examples 1 and 2, exemplifies the benefits of phosphinic acid over a standard esterification catalyst.

EXAMPLE 5

The reaction was carried out as in Example 4 except that no catalyst was used. The product had an acid number of 10, a 99° C. softening point, a color of 12 and required 24 hours at reaction temperature.

EXAMPLE 6

To a suitable plant scale esterification reactor were added 100 parts of a tall oil rosin with a Gardner color of 7+, 12.2 parts of pentaerythritol and 0.2 parts of 50% active phosphinic acid in water. The mixture was heated at up to 280° C. for 17½ hours to give an ester with an acid number of 8.9, a 96° C. Ring and Ball softening point and a color of 8.

EXAMPLE 7

To a suitable reaction vessel was added 100 parts of a commercial partially hydrogenated wood rosin with a Gardner color of 5+, 12.3 parts of pentaerythritol and 0.2 parts of 50% active phosphinic acid in water. The mixture was heated at up to 270° C. for 17½ hours to give an ester with acid number of 14, a 94° C. Ring and Ball softening point and a color of 6½.

EXAMPLE 8

The reaction was carried out as in Example 7 except that a hydrogenated tall oil rosin with a Gardner color of 4+ was employed. The product had an acid number of 14, a 93° C. softening point, a color of 8+ and required 17½ hours at reaction temperature.

EXAMPLE 9

The reaction was carried out as in Example 7 except that a disproportionated tall oil rosin with a Gardner color of 4+ as employed and a top temperature of 250° C. was used. The product had an acid number of 12, a 90° C. softening point, a color of 6½ and required 39 hours at reaction temperature.

EXAMPLE 10

To a suitable reaction vessel was added 100 parts of a gum rosin with a Gardner color of 10, 11.5 parts of pentaerythritol and 0.2 parts of 50% active phosphinic acid in water. The mixture was heated to 270° C. for 16 hours to give an ester with an acid number of 12, a 102.5° C. Ring and Ball softening point and a Gardner color of 8−.

EXAMPLE 11

Pentaerythritol esters were prepared according to the invention process from tall oil rosin samples which had been sequentially disproportionated and distilled. To one rosin sample, 0.2% phosphinic acid catalyst had been added while the rosin was still hot after distillation, after which the sample was stirred for one-half hour at 177° C. before cooling. The Gardner color of both samples was 2−. The results are shown in the following table.

| Starting Rosin | Pentaerythritol Ester[a] | | | Remarks |
|---|---|---|---|---|
| | Acid No. | Softening Point, °C. | Gardner Color | |
| 5559-7B | 12.3 | 97 | 6− | [c] |
| 5559-8Ac[b] | 12.3 | 96 | 12 | [d] |
| | 10.4 | 96 | 7¼ | [e] |

[a]All esters prepared using top temperature of 260° C.
[b]Contains 0.2% phosphinic acid.
[c]0.5% phosphinic acid added.
[d]No catalyst added.
[e]0.3% phosphinic acid added.

The ester made from the retained rosin containing 0.2% catalyst was, in general, inferior in color to the ester made using fresh catalyst. Even when an additional 0.3% fresh catalyst was added, the product was darker.

Examples 7, 8, 9, 10 and 11 are evidence of phosphinic acid's catalytic activity for esterification both of rosin other than tall oil and for rosins which have been subjected to a prior modifying reaction.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A process for esterifying rosin with at least an equivalent of pentaerythritol which comprises heating the rosin and pentaerythritol in the presence of phosphinic acid catalyst.

2. The process of claim 1 wherein the reaction is conducted in an inert environment for from 18 to 20 hours at from 180° C. to 300° C. in the presence of 0.01% to less than 0.5% phosphinic acid, followed by a steam sparge and addition of sodium hydroxide in an amount sufficient to neutralize the phosphinic acid.

3. The process of claim 1 wherein the rosin is esterified with a 15–18% excess equivalent of pentaerythritol at from 250° C. to 280° C.

4. The process of claim 1, 2 or 3 wherein the rosin is selected from the group consisting of tall oil rosin, gum rosin and wood rosin.

5. The process of claim 1, 2 or 3 wherein the rosin is selected from the group consisting of disproportionated rosin, hydrogenated rosin and polymerized rosin.

6. In a process for esterifying rosin with pentaerythritol to obtain the corresponding ester, the improvement which comprises conducting the esterification reaction in an inert environment in the presence of from 0.01% to less than 0.5% phosphinic acid, based on the weight of the rosin, at a temperature of from about 180° C. to about 300° C. for up to 20 hours and neutralizing the phosphinic acid with sodium hydroxide.

7. The process of claim 6 wherein the rosin is esterified with a 15–18% excess equivalent of pentaerythritol in the presence of from 0.1% to 0.25% phosphinic acid and the reaction is conducted under an inert gas sparge.

8. The process of claim 6 wherein the esterification reaction is conducted at a temperature of from 250° C. to 280° C.

9. The process or claim 7 wherein the inert gas is nitrogen.

10. The process of claim 6, 7 or 8 wherein the rosin is selected from the group consisting of tall oil rosin, gum rosin and wood rosin.

11. The process of claim 6, 7 or 8 wherein the rosin is selected from the group consisting of disproportionated rosin, hydrogenated rosin and polymerized rosin.

12. A process for effecting tall oil rosin esterification which comprises reacting at a temperature ranging from 180° C. to 300° C. a tall oil rosin with pentaerythritol in an equivalent amount but not more than a 18% excess based on the equivalent weight of the rosin in the presence of from 0.01% to less than 0.5% phosphinic acid, based on the weight of the rosin, and, thereafter recovering a tall oil rosin-pentaerythritol ester having a color of 0–2 Gardner color units above the color of the rosin and a Ball and Ring softening point of from 95° C. to 105° C.

13. The process of claim 12 wherein 0.1% to 0.25% phosphinic acid is employed and the reaction is conducted under an inert gas sparge.

14. The process of claim 12 wherein the reaction temperature range is from 250° C. to 280° C.

15. A tall oil rosin ester prepared by reacting a tall oil rosin with a 15–18% excess equivalent of pentaerythritol by heating the rosin and the pentaerythritol in an inert environment for from 18 to 20 hours at from 250° to 280° C. in the presence of from 0.01% to less than 0.5% phosphinic acid catalyst, followed by a steam sparge and the addition of sodium hydroxide in an amount sufficient to neutralize the phosphinic acid wherein the tall oil rosin ester exhibits both a color of 0–2 Gardner color units above the color of the tall oil rosin and a Ball and Ring softening point of from 95° C. to 105° C.

16. The product of claim 15 wherein the reaction is conducted in the presence of from 0.1% to 0.25% phosphinic acid and the inert environment is provided by an inert gas sparge.

17. The product of claim 16 wherein the inert gas is nitrogen.

* * * * *